United States Patent
Gerusz et al.

(10) Patent No.: US 8,211,842 B2
(45) Date of Patent: Jul. 3, 2012

(54) PREVENTIVE AND/OR CURATIVE AGENT FOR CLEANING MATERIALS THAT ARE BROUGHT INTO CONTACT WITH WATER

(76) Inventors: Roman Gerusz, Peronnas (FR); Antoine Vanlaer, Paris (FR)

( * ) Notice: Subject to any disclaimer, the term of this patent is extended or adjusted under 35 U.S.C. 154(b) by 77 days.

(21) Appl. No.: 12/441,640

(22) PCT Filed: Sep. 14, 2007

(86) PCT No.: PCT/FR2007/051937
§ 371 (c)(1),
(2), (4) Date: Oct. 1, 2009

(87) PCT Pub. No.: WO2008/034995
PCT Pub. Date: Mar. 27, 2008

(65) Prior Publication Data
US 2010/0048445 A1 Feb. 25, 2010

(30) Foreign Application Priority Data
Sep. 18, 2006 (FR) .................................... 06 53785

(51) Int. Cl.
*C11D 17/00* (2006.01)
*C11D 17/06* (2006.01)
*C11D 7/12* (2006.01)
*C11D 7/16* (2006.01)
*C11D 7/26* (2006.01)
*C11D 7/56* (2006.01)
*C11D 7/60* (2006.01)
*C02F 5/04* (2006.01)
*C02F 5/08* (2006.01)
*C02F 5/10* (2006.01)

(52) U.S. Cl. ........ 510/162; 510/108; 510/375; 510/376; 510/445; 510/446; 510/509; 510/510; 510/512; 252/175; 252/181

(58) Field of Classification Search .................. 510/108, 510/191, 220, 224, 238, 247, 375, 376, 378, 510/445, 446, 510, 512, 162, 509; 252/175, 252/181
See application file for complete search history.

(56) References Cited

U.S. PATENT DOCUMENTS

| | | | |
|---|---|---|---|
| 3,156,654 A * | 11/1964 | Konecny et al. ......... | 252/186.31 |
| 3,671,629 A | 6/1972 | Levy et al. | |
| 3,945,951 A * | 3/1976 | Arai et al. ..................... | 510/351 |
| 4,116,860 A | 9/1978 | Kunin | |
| 4,215,990 A * | 8/1980 | Barrett et al. ..................... | 8/107 |
| 4,261,849 A | 4/1981 | Benjaminson | |
| 4,325,933 A * | 4/1982 | Matsumoto et al. ........ | 423/415.2 |
| 4,749,508 A * | 6/1988 | Cockrell et al. ............. | 510/201 |
| 4,764,280 A | 8/1988 | Brown et al. | |
| 4,992,208 A | 2/1991 | Ireland | |
| 5,104,584 A * | 4/1992 | Kong .............................. | 510/309 |
| 5,346,680 A * | 9/1994 | Roesler et al. ................ | 423/274 |
| 5,474,704 A | 12/1995 | Zaid | |
| 5,478,488 A * | 12/1995 | Doetsch et al. ............... | 510/375 |
| 6,113,805 A * | 9/2000 | Schutte et al. .............. | 252/186.2 |
| 6,340,712 B1 | 1/2002 | Kunin et al. | |
| 6,531,519 B2 | 3/2003 | Patil | |
| 6,759,380 B2 * | 7/2004 | Singh et al. ................... | 510/351 |
| 2002/0082182 A1* | 6/2002 | Kott et al. ..................... | 510/357 |
| 2004/0220069 A1* | 11/2004 | Dykstra et al. ................ | 510/314 |

FOREIGN PATENT DOCUMENTS

| | | |
|---|---|---|
| AU | 775 938 | 11/2000 |
| EP | 0623553 A1 * | 11/1994 |
| EP | 0 876 762 | 11/1998 |
| FR | 1.600.910 | 8/1970 |
| FR | 2 872 048 | 8/2004 |
| GB | 1242221 | 8/1971 |
| GB | 2 113 707 | 8/1983 |
| JP | 60-255147 | 12/1985 |
| WO | 90/04960 | 5/1990 |
| WO | WO 95/15292 A1 * | 6/1995 |
| WO | 97/28241 | 8/1997 |

OTHER PUBLICATIONS

International Search Report dated Feb. 19, 2008, from corresponding PCT application, (PCT/FR2007/051937).

* cited by examiner

*Primary Examiner* — Lorna M Douyon
(74) *Attorney, Agent, or Firm* — Sofer & Haroun, LLP

(57) ABSTRACT

The present invention relates to an agent for the preventive and/or curative cleaning of materials in contact with water, characterized in that it includes sodium chloride and at least one dispersant detergent and/or a non-ionic surfactant having at least one detergent action and at least one oxidizing agent, characterized in that the oxidizing agent is selected from solid-form precursors of hydrogen peroxide and in that the cleaning agent is in solid form, such as pellets, granules, bars tablets, large pellets or powder, the salt(s) being used as binders between the various components. Another objective of the present invention is to provide a method for agglomerating the various ingredients according to the present invention, even when they are present in a liquid form. The present invention also relates to the use of the cleaning agent for the preventive and/or curative cleaning of materials in contact with water.

6 Claims, No Drawings

PREVENTIVE AND/OR CURATIVE AGENT FOR CLEANING MATERIALS THAT ARE BROUGHT INTO CONTACT WITH WATER

This invention relates to an agent for the cleaning of materials that are brought into contact with water, as well as its use for preventing the adhesion of organic and inorganic deposits, such as bacterial proliferation in particular within ion-exchange resins, ion-exchange devices such as water softeners, dishwashers or filters, and water systems of pools, spas, and public facilities and restrooms.

The cleaning of materials that are brought into contact with household water or industrial water is a significant and urgent problem.

This problem relates to, for example, the large public market for ion-exchange devices, such as drinking water softeners, as well as the industrial market for water systems for cooling, for demineralization, for boiler rooms and for water vapor production.

Thus, the materials that are brought into contact with the water can be zeolites or ion-exchange resins for ion-exchange devices (water softeners) for drinking water or industrial water or the surface of the materials that are brought into contact with stagnant water, confined or flowing, such as filters, water systems, floors of facilities, tanks and cisterns.

Such materials actually have the drawback of having to be periodically cleaned or sanitized.

For example, despite the use of drinking water, a micro-deposit of mineral and organic scale, like the formation of a biofilm, is gradually observed on the surface or in the micropores of the ion-exchange resin balls. These phenomena are, moreover, primarily observed during extended shutdowns of ion-exchange devices. However, this mineral and organic scale will have the effect not only of causing pathogenic bacteria to proliferate, but also of forming nauseating odors and preventing ion exchanges. In addition, the organic and inorganic deposits are not destroyed during the standard regeneration of resins by the concentrated brine (NaCl).

This is why, in the majority of countries such as in Europe and in the United States, health directives and recommendations have been put into place with the requirement to periodically clean and sanitize (disinfect) the ion-exchange resins during their regeneration.

So as to eliminate this problem, automatic disinfection devices, such as salt mini-electrolyzers that make it possible to form chlorine and then sodium hypochlorite during the regeneration cycle, have been proposed. These chorine-based devices have the drawback of reacting and degrading in particular the ion-exchange resins, leading the manufacturers of these resins to take measures to restrict guarantees in the event that chlorine-concentrated products or systems are used.

New anti-microbial ion-exchange resins have furthermore been proposed.

The document U.S. Pat. No. 6,531,519 relates to ion-exchange resins, characterized by the fact that the anti-microbial agents are encapsulated and attached in the micropores of the resin. However, the synthesis of these anti-microbial resins is complex and has a high price. In addition, these anti-microbial resins do not prevent the deposition over time of mineral or organic scale that gradually forms a barrier to ion exchanges.

In the document U.S. Pat. No. 4,764,280, a servo system is proposed that makes it possible to reduce the taste and the odor of the water, in particular the "rotten egg" odor caused by non-pathogenic, anaerobic bacteria, such as Desulfuviuibrio desulfuricaus. However, this servo system does not eliminate the micro-deposit of mineral and organic scale that accumulates on the surface of the resins, thus forming a barrier to ion exchanges.

The document U.S. Pat. No. 6,340,712 describes a regeneration agent in liquid form, without chlorine, based on potassium acetate and adjuvants, such as citric acid and wetting surfactants in a very small quantity, so as to limit the bacterial development. However, also in this case, the micro-deposit of mineral and organic scale is not completely eliminated.

The use of oxidized water (liquid hydrogen peroxide) that is concentrated between 20% and 40% also has been recommended as a means for disinfecting ion-exchange resins, making it possible to eliminate these drawbacks. However, in addition to the difficulty of producing a specific metering based on the regeneration mode and the volume of resins, this periodic operation is necessary twice per year and may be forgotten by the user of the ionic softener.

Furthermore, a regenerating composition for ion-exchange resins, which can be found in solid form and more particularly in pellet form, comprising 70-80% by weight of sodium or potassium chloride and 5-15% by weight of sodium or potassium carbonate, is known by the document U.S. Pat. No. 4,116,860.

Furthermore, a composition to regenerate the cation-exchange resins that are typically used in water softeners is known through the document U.S. Pat. No. 5,474,704. More particularly, the composition that is described in this document has as its object the sequestration of iron. This composition comprises 99 to 99.75% sodium chloride, and 0.00125 to 0.90% sodium or potassium gluconate, and it is put in pellet form in a conventional manner.

The document U.S. Pat. No. 4,261,849 describes a cleaning composition to eliminate odors, to treat or clean surfaces, and to protect them from microbial degradation. This composition preferably comprises sodium bicarbonate and sodium chloride and fuller's earth and is found in the form of dry powder. Thus, this document does not describe a composition that is designed to be applied for the cleaning of materials that are brought into contact with water.

The document JP60-255147 describes a regenerating agent for water softeners that is prepared from an electrolyte that releases potassium ions such as potassium chloride or potassium carbonate. In order to eliminate the iron deposits, this document describes the use of a water-soluble oxidizing agent, such as sodium percarbonate or potassium hypochlorite. However, so as to put this regenerating agent in pellet form, it is necessary to use a binder, such as guar gum or polyvinyl pyrrolidone, in the electrolyte that releases potassium ions and water-soluble oxidizing agent, to mix the mixture with a volatile solvent, then to pass the thus obtained mixture through a sieve, and finally to evaporate the solvent.

The document UK2113707 relates to a complex process so as to prepare detergent compositions in the form of granules that are designed to be used in washing machines. Example 4, page 7, describes a composition that comprises, i.a., dispersive detergents: sodium tripolyphosphate, sodium carbonate, an alkaline salt such as sodium chloride.

Furthermore, a process to form a solid detergent product (hard) that is designed to be used in washing machines and that comprises 0.5 to 10% of an alkylpolyglycoside, 0.1 to 10% of a basic component in salt form such as sodium chloride, 30 to 75% of a hydrating alkaline component such as sodium carbonate, is known according to the document WO 97/28241.

The document WO 03/02867 describes a perfumed granular composition that is designed to be used in washing machines that in addition to perfume comprise sodium carbonate, sodium tripolyphosphate, sodium chloride and a non-ionic surfactant.

Finally, the document WO 90/04960 describes a perfume composition that is designed to be integrated into potpourri, chemical substances in powder form, deodorants for domestic animals . . . or in hot water. This document does not describe an agent for the cleaning of materials that are brought into contact with water, but a perfumed composition.

In conclusion, none of the above-mentioned documents describes a simple and low-cost composition that makes it possible to obtain an agent for the cleaning of materials that are brought into contact with water in solid form, such as in the form of pellets, which do not disintegrate in ambient air or under pressure that is exerted by, for example, the user's hand.

In addition, the agent for the cleaning of materials that are brought into contact with the water according to this invention can be used to clean and also to prevent the adhesion of organic or inorganic deposits, such as the bacterial proliferation, in the washing machine, the filters and the water systems.

The invention has as its object to propose an agent for the cleaning of materials that are brought into contact with water that has numerous qualities and that makes it possible to partially prevent the above-mentioned secondary effects. More particularly, the invention has as its object to propose a product that makes it possible to prevent the appearance of organic material and/or to treat the materials that are brought into contact with water, in particular those that are treated by an ion-exchange device for drinking water or industrial water (water softeners) or are present in a dishwasher, as well as filters or water systems of pools and spas, and those of public facilities and restrooms.

The purpose of this invention is also to propose a process that makes it possible to agglomerate the various components that are suitable for this invention, in particular when the latter are in liquid form.

The invention relates to a preventive and/or curative agent for the cleaning of materials that are brought into contact with water, characterized in that it comprises sodium chloride, a dispersive detergent agent and/or a non-ionic surfactant that has a detergent action, and an oxidizing agent, whereby said oxidizing agent is selected from among the precursors of hydrogen peroxide in solid form, such as: the alkaline perborates, the alkaline percarbonates, the alkaline persulfates or permonosulfates, the alkaline peroxides, the potassium permanganate, the potassium ferrate or mixtures thereof, and in that said cleaning agent comes in solid form, such as in the form of pellets, granules, tablets, pills or pebbles, whereby the various components are linked only by sodium chloride.

Preferably, said cleaning agent also comprises an alkaline detergent.

Advantageously, said hydrogen peroxide precursor in solid form, such as in granule form, is covered by a thin protective coating, with a salt base, such as sodium sulfate, potassium sulfate, calcium sulfate or magnesium sulfate.

According to a first characteristic, the cleaning agent can also comprise at least one specific catalyst for decomposition of hydrogen peroxide, such as the metal salts of iron, copper, cobalt, zinc, molybdenum, silver or mixtures thereof.

According to a second characteristic, the cleaning agent can also comprise at least one stabilizer of hydrogen peroxide, such as chelates: phosphonates, sodium gluconates, acid sodium pyrophosphates, monocalcic phosphates; or organic acids: citric acid, maleic acid, tartaric acid; or acetanilide; or anti-clotting agents: precipitated silicas; or mixtures thereof.

Advantageously, said hydrogen peroxide stabilizer represents 0.01% to 5%, preferably 0.5% to 1%, by weight, relative to the total weight of the cleaning agent.

Preferably, said dispersing detergent agent is selected from among: sodium tripolyphosphate, potassium tripolyphosphate, sodium or potassium silicate, sodium or potassium metasilicate, sodium gluconate or mixtures thereof, and said non-ionic surfactant that has at least one detergent action is selected from among: soft soaps, alkyl polyglucosides, amine oxides, polyol esters, alkanolamides, saponins or mixtures thereof.

Advantageously, said alkaline detergent agent is selected from among sodium or potassium carbonate, or sodium or potassium bicarbonate.

In particular, the cleaning agent comprises 25% to 99.9%, preferably 95% to 98%, by weight of sodium chloride, 0.01% to 75% by weight of at least one dispersive detergent agent and/or a non-ionic surfactant that has a detergent action, 0.01% to 45%, preferably 0.5% to 3%, by weight of at least one alkaline detergent, and 0.01% to 50%, preferably 1% to 3%, by weight of at least one oxidizing agent, relative to the total weight of the cleaning agent.

Preferably, for the application in the ion-exchange devices as within the water softeners, said cleaning agent comprises 95.5% to 98% sodium chloride, 0.01% to 3% sodium tripolyphosphate, 0.5% to 1.5% sodium carbonate, 1% to 3% sodium percarbonate, and 0.01% to 0.5% sodium gluconate, by weight, relative to the total weight of the cleaning agent.

Another object of the invention relates to a process for the production of said cleaning agent as described above that comprises the stages that consist in:

Spraying with water on the alkaline salt(s), such as sodium chloride, and/or on various additives in solid form that were previously mixed with said salt(s), at least one detergent compound, such as a dispersing detergent, a detergent surfactant in liquid form and/or various additives in liquid form, such as: biocide agents, wetting surfactants, water-repellent agents, catalysts for decomposition of hydrogen peroxide precursors, and stabilizers for decomposition of hydrogen peroxide, so as to obtain a mixture in solid form, Optionally mixing the mixture that is obtained in the preceding stage with at least one detergent compound and/or additives in solid form, And molding the cleaning agent in the desired form: pellets, granules, tablets, pills or pebbles.

This invention also has as its object the use of the cleaning agent according to one of the characteristics above for the preventive and/or curative cleaning of materials that are brought into contact with water, such as ion-exchange resins, ion-exchange devices such as water softeners, dishwashers, filters, and water systems of pools, spas, and public facilities and restrooms.

The invention will be better understood, and other objects, details, characteristics and advantages of the latter will appear more clearly during the following detailed explanatory description of an embodiment of the invention, provided purely by way of illustration and not limiting.

As indicated above, the invention relates to a preventive and/or curative agent for the cleaning of materials that are brought into contact with water, characterized in that it comprises sodium chloride and optionally other alkaline salts, at least one dispersing detergent and/or a non-ionic surfactant that has at least one detergent action and at least one oxidizing agent of the hydrogen peroxide precursor type and in that said cleaning agent comes in solid form, such as in the form of pellets, granules, tablets, pills, pebbles or powder, whereby the salt (sodium chloride) plays the role of binder between the various components cited above.

In a surprising manner, the applicant discovered that the addition to the sodium chloride of dispersing detergents and/or non-ionic surfactants that have at least one detergent action, oxidizing agent and optionally various additives (alkaline detergents, biocide agents, wetting surfactants, chelating agents), whether they are in liquid form or solid form, makes it possible to agglomerate them in solid form (pellets, tablets, . . . ). This is undoubtedly made possible thanks to the binding effect of the sodium chloride.

This product is thus preferably in the form of powder or granules, pellets, pebbles, tablets, non-friable/non-crumbling pills that will easily disintegrate in the water to be treated.

Consequently, this presentation method thus has the advantage of being easy to use because it is easy to handle and can be metered easily, which represents a real aid to the user of the agent for cleaning the materials that are brought into contact with the water.

The alkaline salt(s) also make(s) it possible to regenerate the ion-exchange resins and those of the ion-exchange devices for drinking or industrial water, such as the resins of the water softeners.

They also have the advantage of being non-polluting and making possible, according to the invention, the cleaning and the sanitizing of the surfaces of the materials that are in contact with water.

The quantity of these alkaline salts and more particularly sodium chloride can vary from 25% to 99.9% by weight, relative to the total weight of the cleaning agent. Advantageously, the quantity of sodium chloride is between 95% to 98% when the cleaning agent is used in the ion exchangers or water softeners, 50% to 95% when the latter is used in the domain of dishwashers, and between 25% and 95% when the cleaning agent is used in the filters and water systems of pools and spas or for public facilities and restrooms. The percentages above are provided by weight relative to the total weight of the cleaning agent.

In a particularly preferred manner, the alkaline salt is pure sodium chloride of food quality.

The other alkaline salts that are suitable for this invention are selected from among: sodium chloride, potassium chloride, ammonium chloride, sodium acetate, potassium acetate, sodium or potassium formate, or mixtures thereof.

The dispersing detergents that are suitable for this invention can be: sodium or potassium tripolyphosphate, silicate of soda or potassium, sodium or potassium metasilicate, sodium gluconate or mixtures thereof; preferably, the dispersive detergent will be sodium or potassium tripolyphosphate. Even more preferably, the dispersing detergent that is suitable for this invention will be sodium or potassium tripolyphosphate, either of anhydrous type or of hexahydrated type. It can also be considered to use a hybrid mixture such as sodium tripolyphosphate and potassium tripolyphosphate or sodium tripolyphosphate and potassium phosphate/sulfate, so as to increase the solubility of tripolyphosphate in the concentrated soda medium.

The cleaning agent according to this invention can also comprise an alkaline detergent.

The latter is selected from among: sodium or potassium carbonate, or sodium or potassium bicarbonate.

The dispersing or alkaline agent is preferably classified as food contact, in particular if the cleaning agent is used to clean the resins of an ion exchanger for drinking water.

The dispersing or alkaline detergent agent(s) can be in solid form: granules, or in powder form, but also in liquid form, for example: a 50% potassium tripolyphosphate solution.

The metering of the dispersing detergent agent(s) in the mixture is variable, but between 0.001% and 75%.

Advantageously, the quantity of dispersing detergent is between 0.5% to 3% when the cleaning agent is used in the ion exchangers or the water softeners, 0.5% to 45% when the latter is used in the domain of dishwashers, and between 0.5% and 75% when the cleaning agent is used in the filters and water systems of pools and spas, or public facilities and restrooms. The percentages above are provided by weight relative to the total weight of the cleaning agent.

The applicant actually noted, on the one hand, that beyond a quantity of 5% of dispersive detergent agents, such as the sodium tripolyphosphate in the ion exchangers, there is a high risk of the deposit of non-solubilized residue of this compound on the surface of the resins. On the other hand, the applicant noted that the fact of mixing the tripolyphosphate, which is a compound that hydrates at ambient temperature, with sodium chloride would make it possible to counteract this drawback and that it was easier to obtain a hard pellet, which does not disintegrate easily. Another way to eliminate this drawback (hydration of the sodium tripolyphosphate) would be to use a pre-hydrated grade of sodium or potassium tripolyphosphate.

In addition, for commercial reasons, the sodium tripolyphosphate could be colored in advance with food dyes.

The function of the dispersing detergent is to disperse and to clean the mineral and organic scale. It also, like sodium tripolyphosphate, provides additional alkalinity to the cleaning agent. In addition, the latter component is compatible with salt, alkaline detergents, peroxide oxidizers, and chelating complexing agents.

Likewise, the alkaline detergent agent will preferably represent 0.01% to 45%, preferably 0.5% to 3%, of the cleaning agent. Advantageously, the quantity of alkaline detergent is between 0.5% to 3% when the cleaning agent is used in the ion exchangers or in water softeners, 0.5% to 45% when the latter is used in the domain of dishwashers, and between 0.5% and 75% when the cleaning agent is used in the filters and water systems of pools and spas, or public facilities and restrooms. The percentages above are provided by weight relative to the total weight of the cleaning agent.

Beyond a weight of 5% of alkaline detergent when the cleaning agent is used in the ion exchangers, the applicant has actually discovered that there was a risk of excess alkaline detergent that was useless, for example, for use in ion exchangers. The alkaline detergent will preferably be sodium carbonate. The latter is actually compatible with salt (sodium chloride), sodium tripolyphosphate, peroxide oxidizers and chelating complexing agents.

The cleaning agent can also comprise a non-ionic surfactant that has at least one detergent action, called "detergent surfactant" below.

These surfactants preferably will be non-cationic because the latter would be linked to sites of the ion-exchange resin, thus preventing its proper operation. Furthermore, the detergent surfactant is to be effective so as to clean the materials that are in contact with water, but also authorized food contact, in particular in the case of ion-exchange resins for drinking-water ion exchangers. In addition, the detergent surfactant is not to foam too much at a normal level of use so as to prevent the introduction of air into the ion exchangers (water softeners).

The non-ionic detergent surfactants that are suitable for this invention can be, for example, of the type: soft soaps, alkyl polyglucosides, such as SIMULSOL® SL 4 or SIMULSOL® SL10 or SIMULSOL® SL11, marketed by SEPPIC SA, amine oxides (AMMONYX® D040 or LO-E® of STEPAN Europe), polyol esters, alkanolamides, saponins or mixtures thereof.

The detergent surfactant can come in solid form, such as powder, or in liquid form. In the latter case, it can be sprayed directly onto the particles of alkaline salts or previously absorbed on a solid substrate. This solid substrate can be, for example, of the powder type of precipitated silica, or kieselguhr, diatomaceous earth, clays in powder form, said detergent dispersing if the latter is in solid form or else another non-ionic surfactant in powder form, such as the saponins.

These substrates are generally used at a low dose, on the order of 0.001% to 10% by weight relative to the total weight of the cleaning agent. According to the initial proportions of the components in liquid form of this invention, one skilled in the art will know to select the most appropriate substrate, knowing that the silica and the diatomaceous earth can absorb more than half of their weight against 5% maximum of their weight for the detergent or the salt, so that the latter remain in the form of relatively dry and manageable powder.

This detergent surfactant preferably does not represent more than 15%, preferably not more than 2%, by weight relative to the total weight of the cleaning agent.

The cleaning agent can also comprise wetting surfactants, like the ethoxylated alcohols such as MAKON ® NF12, marketed by STEPAN Europe, but also soft soaps, alkyl polyglucosides, such as SIMULSOL® SL4 or SIMULSOL® SL10 or SIMULSOL® SL11, marketed by SEPPIC SA, the amine oxides (AMMONYX® D040 or LO-E® of STEPAN Europe), saponins or mixtures thereof that have the properties of being both detergents and wetting agents.

This wetting surfactant preferably does not represent more than 15%, preferably between 0.01% and 2%, by weight relative to the total weight of the cleaning agent.

The addition of a dispersing and alkaline detergent and/or a wetting detergent surfactant with alkaline salts will make it possible to:
  Wet the organic deposits or mineral scale on the surface of the micropores of the materials, which will have the effect of unsticking them and dispersing them;
  Saponify and emulsify the organic materials, which from that time on can easily be eliminated during a rinsing stage, for example.

The dispersing and alkaline detergents and/or detergent surfactant also have the advantage of improving the cleaning and the removal of non-oxidizable mineral scale, in particular that fixed in the micropores of ion-exchange resins, for example.

In addition, the in-depth cleaning of the micropores on the surface of these materials makes it possible not only to avoid a possible formation of biofilm but also to permanently ensure a proper cationic exchange: $Ca^{++} \leftrightarrow 2\ Na^+$. However, this proper cationic exchange is necessary for the proper operation of the resin.

The cleaning agent also comprises an oxidizing agent, such as the precursor of hydrogen peroxide in solid form.

These solid precursors of hydrogen peroxide can be selected, for example, from among: perborates ($NaBO_3$, $nH_2O$), percarbonates ($2Na_2CO_3, 3H_2O_2$), persulfates or permonosulfates ($KHSO_5$), alkaline peroxides ($CaO_2$, $MgO_2$, etc.), or potassium permanganate, or potassium ferrate ($K_2FeO_4$). Preferably, sodium percarbonate or peroxyhydrated sodium carbonate ($2Na_2CO_3, 3H_2O_2$) is used as a peroxide precursor. The advantage of the percarbonates is that they are pure and that they release approximately three times more hydrogen peroxide than other precursors, such as the permonosulfates.

Said hydrogen peroxide precursor that is suitable for this invention comes in the form of powder or granules.

For example, the hydrogen peroxide precursors, such as the sodium percarbonates and more particularly the peroxyhydrated sodium percarbonates, can come in the form of powder or granules with a diameter that varies from 0.1 mm to 5 mm and are easily manageable.

For the application in the ion-exchange devices, the hydrogen peroxide precursor represents 0.01% to 50%, preferably 1% to 10%, and even more preferably 3%, by weight relative to the total weight of the cleaning agent.

The applicant has actually discovered that beyond 10% by weight of the hydrogen peroxide precursor relative to the total weight of the cleaning agent, there is a risk of excess oxidizer that is useless, for example, for use in ion-exchange devices.

The hydrogen peroxide precursors are water-soluble at an ordinary temperature. For example, the sodium percarbonate solubilizes easily in water, on the order of 140 g per liter of water, and releases a high level of active oxygen: 1,000 g of sodium percarbonate in fact releases 300 g of pure hydrogen peroxide, or about 140 g of active oxygen. It also releases sodium carbonate, which makes the liquid medium basic and thus protects tubs and pipe systems of household or industrial water against the danger of corrosion. In addition, the sodium carbonate has an additional detergent action that promotes the cleaning of surfaces that are contaminated by scale. Finally, these alkaline percarbonates are non-toxic for the environment, cannot be bioaccumulated, and are non-carcinogenic according to the IARC.

The solid precursor will thus have the effect, after dissolution in water, of releasing hydrogen peroxide and then native oxygen that has an oxidizing action on the organic scale and residual mineral salts or oxides. Consequently, the hydrogen peroxide precursor allows a preventive action of the adhesion of this scale.

The mode of action of hydrogen peroxide is essentially due to the fact that the organic materials and mineral salts or oxides, either in aqueous suspension or attached to the surface of the materials, are oxidized, thus reducing the risk of their adhesion on surfaces of the materials that are in contact with the water, as well as their putrefaction (release of bad odors . . . ).

It should be noted that the solid hydrogen peroxide precursors, such as the percarbonates, are sensitive to the presence of water, and that it is necessary to store them and to handle them in the absence of moisture. This is why, preferably, a hydrogen peroxide precursor that is presented in granule form (diameter of between 0.1 mm and 5 mm), on which a thin protective coating is deposited that makes it possible to harden and to stabilize the precursor granules in storage, will be used within the framework of the invention.

This coating corresponds to a thin protective coating that is based on salts, such as sodium sulfate, potassium sulfate, calcium sulfate or magnesium sulfate. This coating is obtained by spraying sulfate on the surface of the precursor. It can be deposited, for example, at the end of production of said hydrogen peroxide precursor.

This coating makes it possible to harden the surface of the precursor and thus to make it more stable.

Advantageously, said protective coating represents 0.001% to 20%, preferably 0.1% to 10%, and advantageously 1% to 5%, by weight relative to the weight of the hydrogen peroxide precursor.

For example, such precursors, such as the sodium percarbonates, stabilized with coating, are currently marketed under the trademark OXYPER-S® of SOLVAY or ECOX-C® of KEMIRA.

According to the areas of application, it is possible to introduce additional specific catalysts, such as metal salts that are based on iron or copper, molybdenum, or else silver and/or activators of the TAED (tetra-acetyl-ethylene-diamine) type, into the cleaning agent that comprises at least one hydrogen peroxide precursor.

This catalyst can be present in a very small dose, i.e., it does not represent more than 10%, preferably not more than 5%, and even more advantageously not more than 1.5%, by weight relative to the total weight of the cleaning agent.

In addition, it is possible to introduce these specific catalysts directly into the cleaning agent or into the protective coating of said hydrogen peroxide precursor that is described above.

In this case, these catalysts do not represent more than 2%, preferably not more than 1%, and even more preferably not more than 0.3% by weight, relative to the weight of the protective coating.

Said catalyst(s) make it possible to greatly activate the decomposition of the hydrogen peroxide that is released by the precursor when it is brought into contact with water, and to quickly carry out the oxidation reactions, even at low temperatures (5° C.).

If, in contrast, the slowing of the decomposition of liquid hydrogen peroxide is desired to spread its oxidizing activity over time, it is possible to introduce stabilizers of hydrogen peroxide into the cleaning agent and/or into the protective coating of hydrogen peroxide.

These stabilizers of hydrogen peroxide can be, for example: chelating agents of the sodium phosphonate or gluconate type, acid sodium pyrophosphates, monohydrated monocalcic phosphates, or organic acids, such as citric acid, maleic acid, tartaric acid, acetanilide, as well as anti-clotting agents, such as precipitated silicas.

In addition, these chelating agents, such as sodium gluconate, have the special feature of complexing in alkaline medium the metal ions of the type: iron, manganese, aluminum, lead . . . . This special feature offers a certain advantage for the application in the ion-exchange devices, in particular so as to prevent the deposits of these metal ions on the resins. In addition, the sodium gluconate is a crystalline growth inhibitor, and it makes it possible to prevent the deposits of salts or tartars. Finally, this compound is also an inhibitor of corrosion (cast iron, steel).

The quantity of stabilizers of hydrogen peroxide does not exceed more than 5%, preferably not more than 2%, and even more advantageously between 0.1% and 1%, by weight relative to the total weight of the cleaning agent.

The stabilizer(s) of the hydrogen peroxide can be included in the protective coating applied to the surface of the precursor.

Thus, the cleaning agent according to this invention has the advantages of being simple, inexpensive, and effective, so as to prevent the appearance of organic and inorganic materials. It actually keeps the surfaces in contact with the water itself, preventing the formation of their adhesions, a major element of the risk of development and pathogenic proliferation.

Said cleaning agent can also comprise at least one biocide agent.

The biocide agents make it possible to eliminate the possible residual pathogenic germs. Thus, the biocide agent will complete the action of the detergent.

The biocide agents are selected from among the bactericides, the virucides, the fungicides, such as: quaternary ammonium compounds such as didecyl dimethylammonium chloride, the biocide agents of iodophor or biguanide types; the amino derivatives of the triamine type, such as lauryl diethylene triamine, dioctyl diethylene triamine; the essential oils such as the essences of lavender, thyme, rosemary, niaouli, cinnamon, pine, or terpenic derivatives or mixtures thereof.

Among the biocide agents, the quaternary ammonium compounds, such as didecyl dimethylammonium chloride, will preferably be used by adding dispersing detergent. This product is effective, for example, at a dose of 50 ppm as a bactericide according to the standard AFNOR NF T 72-151 on *Escherichia coli* 54127, *Pseudomonas aeruginosa* A22, *Staphylococcus aureus* 53164, *Streptococcus faecalis* 5855 or else on *Mycobactenum smegmatis* 7326.

The biocide agents can come in solid form, such as powder or granules, and/or in liquid form. In the latter case, the biocide agent is previously absorbed either on the surface of the detergent compound in solid form, or on the substrate of precipitated silica, kieselguhr, diatomaceous earth, clay in powder form or saponins, or it is sprayed directly on the particles of alkaline salts or on the detergent compound in solid form.

The biocide agents are used at variable doses, based on requirements and the quantity of dispersing detergent within the cleaning agent. They preferably represent not more than 25%, advantageously between 0.001% to 5%, and even more preferably from 0.01% to 2%, by weight relative to the total weight of the cleaning agent.

The cleaning agent can also be used in combination with proteolytic enzymes that dissolve the greases and promote disinfection and the cleaning of materials in contact with water.

According to a characteristic of the invention, the cleaning agent can also comprise a magnesium or calcium stearate-type water-repellant agent.

The quantity of the water-repellant agent varies respectively between 0.001% to 2% by weight relative to the total weight of the cleaning agent.

The water-repellant agent offers the advantage of improving the resistance to the moisture of the cleaning agent and thus of facilitating its storage. In addition, it makes it possible to handle said agent even in a moist environment.

The cleaning agent can also comprise vehicles such as: anti-foaming agents, sequestering agents, anti-redeposition agents or perfumes. These various components are well known to one skilled in the art.

Another object of the invention relates to a process for the production of said cleaning agent that comprises the stages that consist in:

Spraying with water on the alkaline salt(s) and/or on various additives in solid form that were previously mixed with said salt(s), at least one detergent compound, such as a dispersing detergent, a detergent surfactant in liquid form and/or various additives in liquid form, such as: biocide agents, wetting surfactants, water-repellent agents, catalysts for decomposition of hydrogen peroxide precursors, and stabilizers for decomposition of hydrogen peroxide, so as to obtain a mixture in solid form, Optionally mixing the mixture that is obtained in the preceding stage with at least one detergent compound and/or additives, in solid form, And molding the cleaning agent in the desired form: pellets, granules, tablets, pills or pebbles.

Thus, this particular process makes it possible to agglomerate the various components that are suitable for this invention, even if the latter come in liquid form.

This invention also has as its object the use of the cleaning agent for the preventive and/or curative cleaning of materials that are brought into contact with water, such as zeolites or ion-exchange resins and the ion-exchange devices such as water softeners, and filters, and water systems of pools and spas, or public facilities and restrooms.

Examples are proposed so as to illustrate the invention, but in no case do they limit the scope of the invention.

A—Sample Compositions

The different percentages below are expressed by weight relative to the total weight of the cleaning agent according to this invention.

Then, an oxidizing agent is mixed in the dry state with said premixture, whereby the oxidizing agent is a peroxide precursor in the form of a granule that is coated with an ECOX-C 0.7-type protective coating that is marketed by the KEMIRA Company.

The composition is then easily compressed in a laboratory pellet-making unit (SVIAC 92-ANTHONY).

A pellet that both regenerates and cleans and at the same time prevents deposits from adhering is consequently obtained.

| | Salts | Dispersive Detergents | Detergent and/or Wetting and/or Alkaline Surfactant | Oxidizing Agent | Chelating Agent | Biocide Agent |
|---|---|---|---|---|---|---|
| 1 | 99% NaCl | 1% TPPK[1] | — | — | — | — |
| 2 | 98% NaCl | 1% TPPK[1] | — | — | 1% Na Gluconate | — |
| 3 | 97.5% NaCl | 1% TPPK[1] | — | 1.5% ECOX-C ® 0.7 | — | — |
| 4 | 98.5% NaCl | 1% TPPK[1] | 0.5% SL 11 W[2] | — | — | — |
| 5 | 99.5% NaCl | 0.4% TPPK[1+] | — | — | — | 0.1% DDAC[3] |
| 6 | 99.5% NaCl | — | 0.3% SL 11 W[2] | — | — | 0.2% DDPT[4] |
| 7 | 98% NaCl | 2% TPPNa[5] | — | — | — | — |
| 8 | 97.5% NaCl | 0.5% TTPNa | — | 2% PCNa[6] | — | — |
| 9 | 99% NaCl | 0.5% TPPNa[5] | — | — | 0.4% Na Gluconate | 0.1% DDAC[3] |
| 10 | 96% NaCl | 1% TPPNa | 1% $CO_3Na_2$ | 2% PCNa | 0.01% Na Gluconate | |
| 11 | 96.5% NaCl | 0.5% TPPNa | 1% $CO_3Na_2$ | 2% PCNa | 0.01% Na Gluconate | |
| 12 | 96% NaCl | 0.5% TPPNa | 1% $Co_3Na_2$ | 2% PCNa | 0.5% Na Gluconate | |
| 13 | 98% NaCl | 0.5% TPPNa | 0.5% $CO_3Na_2$ | 1% PCNa | 0.01% Na Gluconate | |
| 14 | 95.5% NaCl | 0.01% TPPNa | 1.5% $CO_3Na_2$ | 3% PCNa | 0.01% Na Gluconate | |

[1]TPPK: Potassium tripolyphosphate
[2]SL11W: SL11W-type alkyl polyglucoside
[3]DDAC: Didecyl dimethylammonium chloride
[4]DDPT: Dioctyl diethylenetriamine
[5]TPPNa: Sodium tripolyphosphate
[6]PCNa: Sodium percarbonate B—Process For Production Of Pellets

EXAMPLE 1

20 g of a 50% aqueous solution of potassium tripolyphosphate (or 10 g of potassium tripolyphosphate in dry material) is sprayed directly on 1,000 g of NaCl alkaline salt in powder form using a spray boom, whereby the alkaline salt is stirred in a slow mixer during the spraying.

A salt in powder form and containing 1% detergent is thus obtained.

The composition is then easily compressed in a laboratory pellet-making unit (SVIAC 92-ANTHONY).

A dual-function pellet: regeneration and cleaning are consequently obtained.

EXAMPLE 2

Sodium gluconate, presented in powder form, is mixed directly with the alkaline salt that is also in powder form, and the 50% TPPK solution is then sprayed, as indicated in Example 1, on said mixture.

The composition is then easily compressed in a laboratory pellet-making unit (SVIAC 92-ANTHONY).

A dual-function pellet: regeneration and cleaning are consequently obtained.

EXAMPLE 3

A premixing based on NaCl alkaline salt and potassium tripolyphosphate in aqueous solution is produced, whereby the potassium tripolyphosphate is sprayed on the salt as in Example 1. A premixing in powder form is then obtained.

EXAMPLE 4

A premixture based on a wetting detergent surfactant: The SL11W-type alkyl polyglucoside in liquid form and an aqueous solution of potassium tripolyphosphate is produced. This premixture is then sprayed on the NaCl alkaline salt, as indicated in Example 1.

The composition is then easily compressed in a laboratory pellet-making unit (SVIAC 92-ANTHONY).

A pellet that has the properties of both regenerating and cleaning and wetting at the same time is consequently obtained.

EXAMPLE 5

A premixture based on a biocide agent: the didecyl dimethylammonium chloride in liquid form and a 50% aqueous solution of potassium tripolyphosphate is produced. This premixture is then sprayed on the NaCl alkaline salt, as indicated in Example 1.

The composition is then easily compressed in a laboratory pellet-making unit (SVIAC 92-ANTHONY).

A pellet that has the properties of both regenerating and cleaning (removing scale) and eliminating pathogenic germs is consequently obtained.

EXAMPLE 6

A premixture based on a biocide agent: the dioctyl diethylenetriamine in liquid form and a wetting detergent surfactant: the alkyl polyglucoside SL11W is produced. This premixture is then sprayed on NaCl alkaline salt, as indicated in Example 1.

The composition is then easily compressed in a laboratory pellet-making unit (SVIAC 92-ANTHONY).

A pellet that has the properties of both regenerating and cleaning (removing scale) and eliminating pathogenic germs is consequently obtained.

EXAMPLE 7

A mixture based on NaCl alkaline salt powder with a powder dispersing detergent: the sodium tripolyphosphate or potassium tripolyphosphate is produced.

The composition is then easily compressed in a laboratory pellet-making unit (SVIAC 92-ANTHONY).

A dual-function pellet: regeneration and cleaning are consequently obtained.

EXAMPLE 8

A mixture based on NaCl alkaline salt in powder form with sodium or potassium tripolyphosphate in powder form and a peroxide precursor: sodium percarbonate in powder form is produced.

The composition is then easily compressed in a laboratory pellet-making unit (SVIAC 92-ANTHONY).

A pellet that both regenerates and cleans and at the same time prevents deposits from adhering is consequently obtained.

EXAMPLE 9

A biocide agent in liquid form: the didecyl dimethylammonium chloride is first sprayed on a detergent in powder form: sodium gluconate. Then, this premixture is mixed in the dry state with an NaCl alkaline salt and a dispersing detergent (TPPNa).

The composition is then easily compressed in a laboratory pellet-making unit (SVIAC 92-ANTHONY).

A pellet that has the properties of both regenerating and cleaning (removing scale) and eliminating pathogenic germs is consequently obtained.

EXAMPLES 10 TO 14

Mixtures based on sodium chloride alkaline salt in powder form, with sodium or potassium tripolyphosphate also in powder form, of an alkaline detergent: sodium carbonate, a hydrogen peroxide precursor: the sodium percarbonate in powder form and a chelating agent: sodium gluconate in powder form, are produced according to various meterings. After compression of these mixtures, the pellets that are regenerating, cleaning, chelating and at the same time preventing deposits from adhering are obtained.

C—Test Of Regeneration Of Ion-Exchange Resins (Pellet, Example 1)

For several months (with an interruption and shutdown for one month after 20 regenerating cycles), the regeneration of cationic resins (AMBERLITE SR1-L-Na type) of two ion exchangers is followed-up by comparison:

The first ion exchanger is regenerated with pure NaCl salt pellets (control)

The second is regenerated with dual-function pellets of Example 1.

After 40 cycles, the surface of the resins regenerated with the dual-function pellets of Example 1 is clean, whereas on the surface of the resins of the control softener, the beginnings of a micro-deposit of scale appear.

Thus, compared to a pure salt pellet, a pellet according to the invention, in addition to providing excess Na+ ions to regenerate the resins, provides the following advantages:

A periodic cleaning, with each regeneration cycle, of the surfaces of resins of the ion-exchange devices;

Preservation and improvement of the exchange capacity of resins by cleaning and maintaining their surfaces;

Prevention of deposits of scale such as metal salts of the type Fe, Mn, Al, Pb, . . . or tartar on the surfaces of the resins;

Prevention of the adhesion of deposits and therefore of the accumulation of scale;

Prevention of the risk of corrosion of the ion-exchange devices and lines;

And the cleaning agent according to this invention makes it possible to avoid the use of aggressive disinfectants for the resins such as chlorine, soda hypochlorite or peracetic acid.

The invention claimed is:

1. A preventive and/or curative agent capable of cleaning materials that are brought into contact with water, comprising, by weight relative to a total weight of the agent:
    95.5% to 98% sodium chloride,
    0.01% to 3% sodium tripolyphosphate,
    0.5% to 1.5% sodium carbonate,
    1% to 3% sodium percarbonate, and
    0.01% to 0.5% sodium gluconate,
    for the application in ion-exchange devices,
    said preventive and/or curative agent being in a solid form selected from the group consisting of: pellets, granules, tablets, pills and pebbles, the sodium chloride acting as a binder in the agent.

2. The preventive and/or curative agent according to claim 1, further comprising a specific catalyst for decomposition of hydrogen peroxide.

3. The preventive and/or curative agent according to claim 1, further comprising a stabilizer of hydrogen peroxide.

4. The preventive and/or curative agent according to claim 1, wherein the sodium percarbonate is covered by a thin, salt based, protective coating.

5. The preventive and/or curative agent according to claim 2, wherein the catalyst is selected from the group consisting of: metal salts of iron, copper cobalt, zinc molybdenum or silver and mixtures thereof.

6. The preventive and/or curative agent according to claim 3, wherein the stabilizer is selected from the group consisting of: phosphonates, sodium gluconates, acid sodium pyrophosphates, monocalcic phosphates, citric acid, maleic acid, tartaric acid, acetanilide, precipitated silicas and mixtures thereof.

* * * * *